Patented Aug. 3, 1937

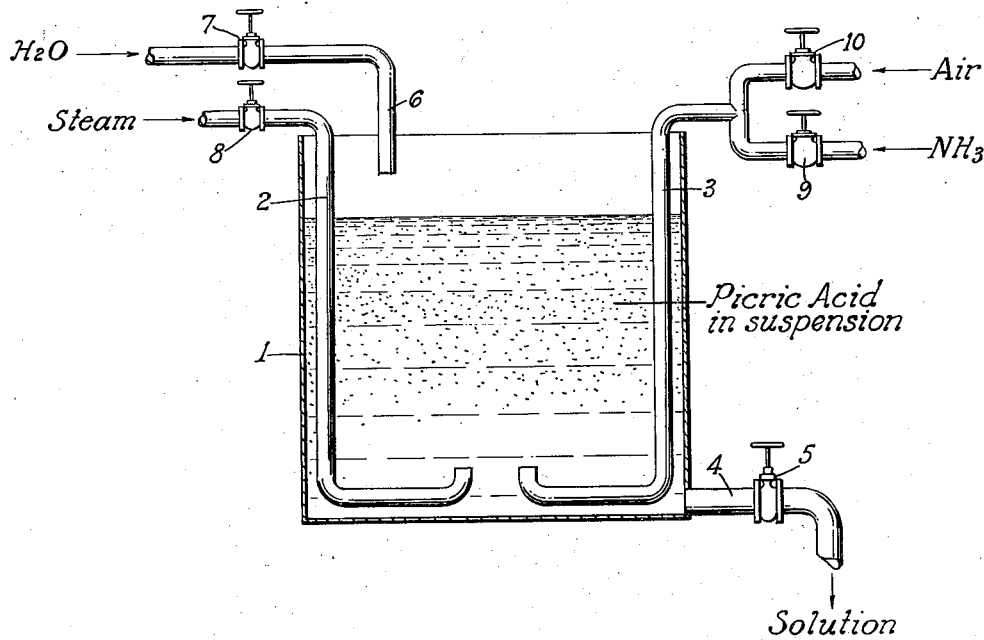

2,088,636

UNITED STATES PATENT OFFICE 2,088,636

PRODUCTION OF AMMONIUM PICRATE

Fred F. Chapman, Wilmington, Del., assignor to E. I. du Pont de Nemours & Company, Wilmington, Del., a corporation of Delaware Application July 9, 1935, Serial No. 30,477

9 Claims. (Cl. 260—143)

The present invention relates to ammonium picrate, and more particularly to a new and improved process for producing the same.

The manufacture of ammonium picrate has heretofore been accomplished by neutralizing picric acid with an aqueous ammonia solution, and subsequently cooling the solution to crystallize the desired product. According to the procedure described by the Office of the Chief of Ordnance, U. S. Government, in "Military Explosives", page 109, ed. 2, 1924, the picric acid is suspended in approximately one-hundred times its weight of water and is then neutralized with aqueous ammonia. This method produces a solution of only 7% concentration with respect to ammonium picrate. The solution is cooled below 25° C. and the crystallized product separated by filtration. Since, however, a very large volume of mother liquor remains, the problem of the disposal of this is serious, especially in large scale production. In addition, such a process is not subject to close chemical control because of the great change in the volume of the solution as the reaction proceeds.

A somewhat improved procedure, which considerably reduced this disposal problem, has also been employed. According to this method, damp picric acid was neutralized with aqueous ammonia to produce a solution of approximately 18% concentration with respect to ammonium picrate. Although this method greatly reduced the volume of the mother liquor to be disposed of, nevertheless, the problem was still serious, and the apparatus required for the production of large amounts of ammonium picrate was much larger than desirable. Furthermore, this procedure left unsolved the problem of chemical control arising from the rapid change of volume of the solution during neutralization.

The object of the present invention is a new and improved process for producing ammonium picrate. A further object is such a process which produces a minimum amount of accumulated mother liquor. A still further object is a process of the character described which lends itself readily to close chemical control. Other objects will be apparent as the invention is hereinafter disclosed.

I have found that the foregoing objects are accomplished by employing anhydrous ammonia in the neutralization of picric acid. By this means the large volume of water formerly introduced as a solvent for the ammonia is avoided, and a solution is obtained having a concentration of approximately 35%. In other words, the volume of the accumulated mother liquor is approximately ⅕ that produced in the older method, and ½ that produced in any prior method. As a result, the size of the apparatus necessary may be very materially reduced, thereby reducing the construction and maintenance cost of the equipment. Since the anhydrous ammonia is admitted as a gas, the volume of the solution does not change appreciably during the operation, hence close chemical control is possible.

According to my invention, the picric acid is suspended in boiling water or the mother liquor obtained from a previous run, and is agitated with live steam. Anhydrous ammonia, in the form of a vapor is then blown into the suspension until the solution is permanently neutral to a suitable indicator. The solution, which is over 35% in concentration, is then transferred to the crystallization tubs and cooled.

In order to describe my invention more clearly, I shall refer to the accompanying diagram which represents one embodiment thereof. This is to be considered solely for illustrative purpose, however, and is not intended as a limitation of the scope of my invention.

The diagram represents a plan view of a neutralizing tub. The illustrated equipment consists essentially of a tub 1 of chemical-ware, wood, or other suitable material, and pipe lines 2 and 3, whereby steam and the ammonia-bearing gas, respectively, may be introduced beneath the surface of the solution. The ammonia line 3 is arranged so that the ammonia gas may be diluted with air or other suitable inert gas, as desired. A discharge line 4, equipped with a suitable valve 5 is connected at the bottom of the tub, and a tap 6 is arranged so that the tub may be easily charged with mother liquor or water. The various pipe lines are furnished with suitable valves 7, 8, 9, and 10.

In operation, 500 lbs. of water, or preferably mother liquor obtained from a previous run, is introduced into tub 1 from the tap line 6 and is brought to a boil by introducing live steam through line 2. While the steam is still passing into the liquid, 300 lbs. of damp picric acid is charged into the tub. Neutralization is immediately started by opening the gaseous anhydrous ammonia valve 9. Also air may be added at the proper time through valve 10. By varying the relative amounts and rates of flow of the air and the ammonia gas, the neutralization may be controlled very closely. During the time that the ammonia is being introduced, the steam supply is regulated at such a rate that a charge temperature of about 200° F. is maintained. The ammonia is introduced until the solution becomes neutral to test papers. The first neutrality is seldom permanent, due to unreacted picric acid in suspension. More ammonia is therefore introduced, and the procedure is continued until the solution remains neutral during ten minutes of boiling with steam, after the ammonia supply is shut off. The solution is then run out through the discharge line 4 into the crystallizing tubs. When the solution has cooled to room temperature the mother liquor is filtered from the separated crystals.

The advantages of such a procedure are important. By this method, the mother liquor is used repeatedly as the solvent for successive runs, thereby overcoming the problem of mother liquor disposal. A solution of 35% concentration, or more, is obtained, thereby greatly reducing the problems of concentration. The admixing of the ammonia gas with air permits a very delicate control over the rate of neutralization. Furthermore, the use of anhydrous ammonia completely avoids the serious problems resulting from a large increase in volume of solution, as when aqueous ammonia is employed in the neutralization.

Among the particular advantages of my process and the method in which it is carried out is the fact that the neutralization is accomplished with a minimum of loss of ammonia, and furthermore that the picric acid may be added in increments from time to time instead of all at one time.

In the foregoing detailed description of my procedure, it will become apparent that many variations may be made without departing from the spirit or scope of the invention. I therefore intend to be limited only in accordance with the following patent claims:

I claim:

1. The process of producing ammonium picrate which comprises reacting picric acid with gaseous ammonia.

2. The process of producing ammonium picrate which comprises reacting picric acid with gaseous anhydrous ammonia.

3. The process of claim 2, in which the picric acid is suspended in water.

4. The process of producing ammonium picrate which comprises reacting picric acid with a gas essentially comprising ammonia.

5. The process of producing ammonium picrate which comprises suspending picric acid in mother liquor from a previous run, agitating the suspension with live steam, introducing a gas essentially comprising anhydrous ammonia beneath the surface of said suspension until the solution is permanently neutral, subsequently cooling said neutral solution and separating the crystals of ammonium picrate from the mother liquor.

6. The process of producing ammonium picrate which comprises suspending picric acid in mother liquor from a previous run, agitating the suspension with live steam, introducing gaseous anhydrous ammonia beneath the surface of said suspension until the solution is permanently neutral, subsequently cooling said neutral solution and separating the crystals of ammonium picrate from the mother liquor.

7. The process of claim 5, in which the picric acid is added at intervals.

8. The process of producing ammonium picrate which comprises suspending picric acid in water, neutralizing said picric acid with anhydrous ammonia, separating the crystals of ammonium picrate from the mother liquor, and subsequently recycling at least a portion of said mother liquor in the neutralization of further quantities of picric acid.

9. The process of producing ammonium picrate which comprises suspending picric acid in mother liquor from a previous run, agitating the suspension with live steam, reacting said picric acid with anhydrous ammonia until the solution is permanently neutral, cooling said neutral solution and separating the crystals of ammonium picrate from the mother liquor, and recycling said mother liquor in a subsequent run.

FRED F. CHAPMAN.